Oct. 29, 1957 R. H. KAROL 2,811,038
APPARATUS FOR THE CONSOLIDATION OF MATERIALS
Filed July 19, 1954 4 Sheets-Sheet 1
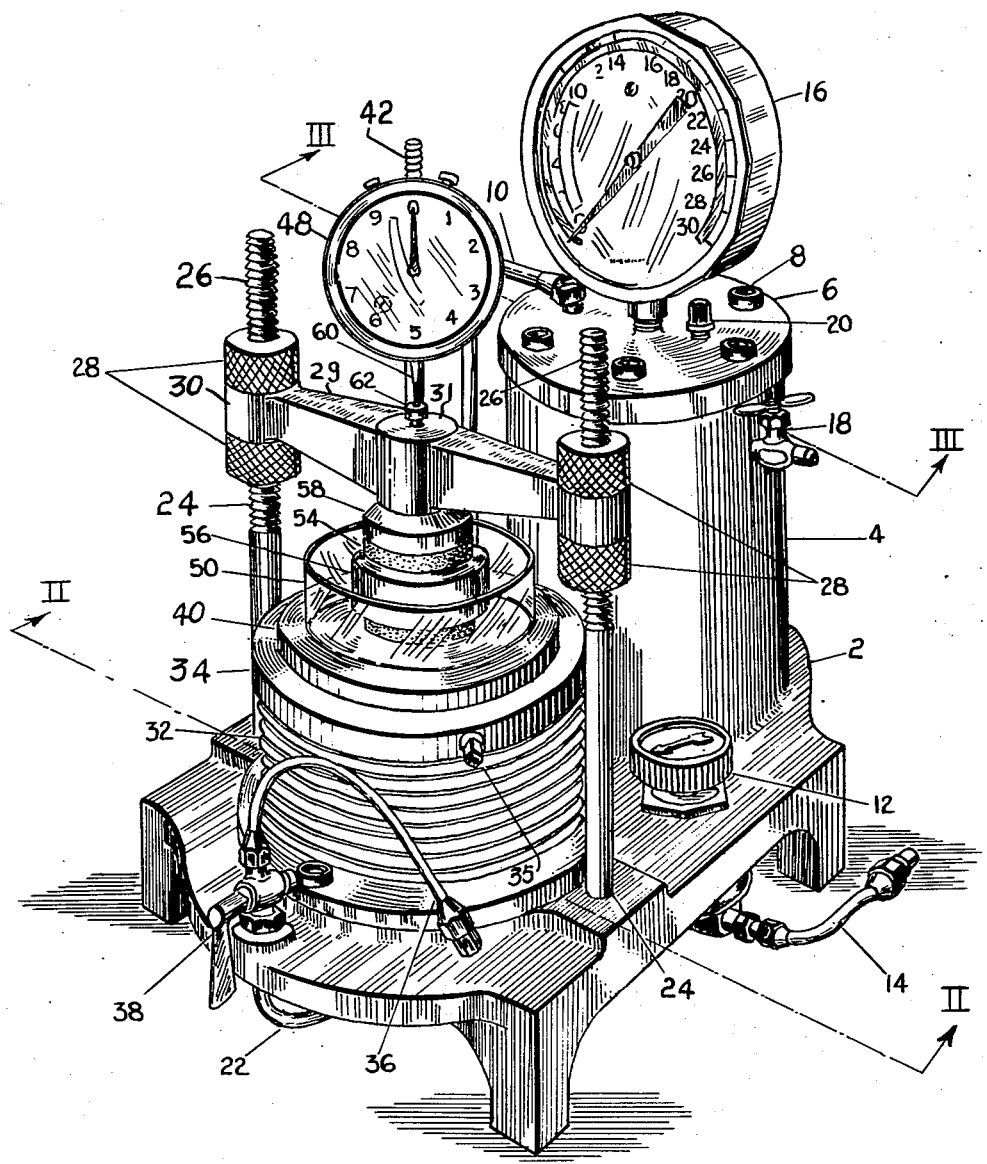
FIGURE I
INVENTOR: REUBEN H. KAROL
ATTORNEY:

Oct. 29, 1957  R. H. KAROL  2,811,038
APPARATUS FOR THE CONSOLIDATION OF MATERIALS
Filed July 19, 1954  4 Sheets-Sheet 2
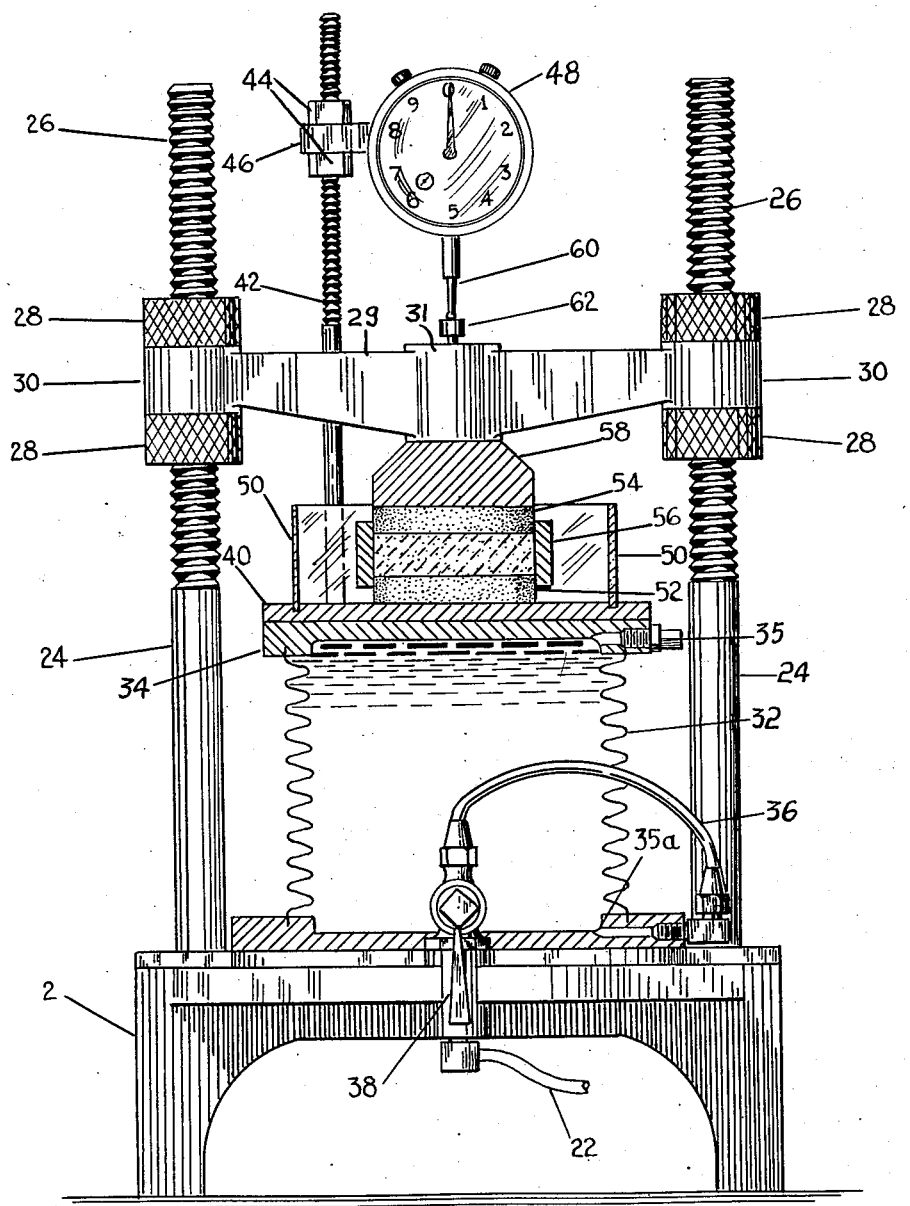
FIGURE II
INVENTOR: REUBEN H. KAROL
ATTORNEY:

Oct. 29, 1957   R. H. KAROL   2,811,038
APPARATUS FOR THE CONSOLIDATION OF MATERIALS
Filed July 19, 1954   4 Sheets-Sheet 3
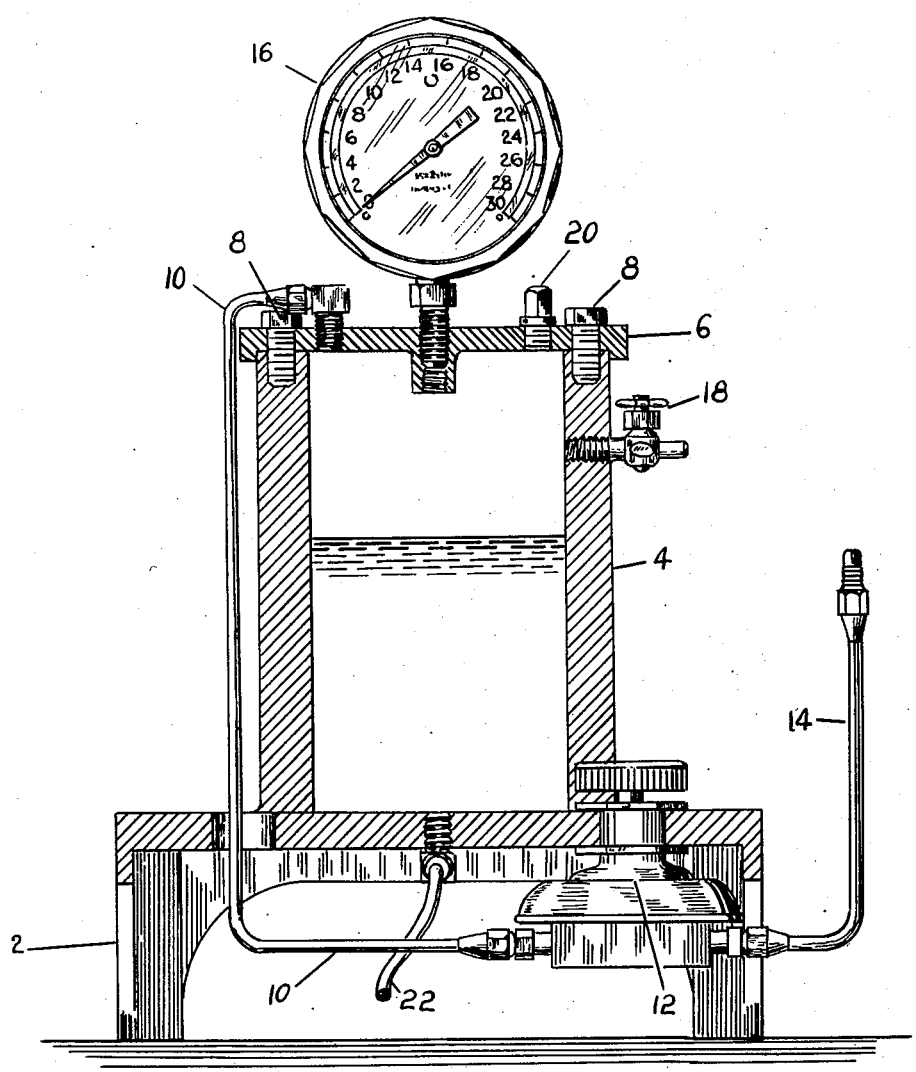
FIGURE III
INVENTOR: REUBEN H. KAROL
ATTORNEY:

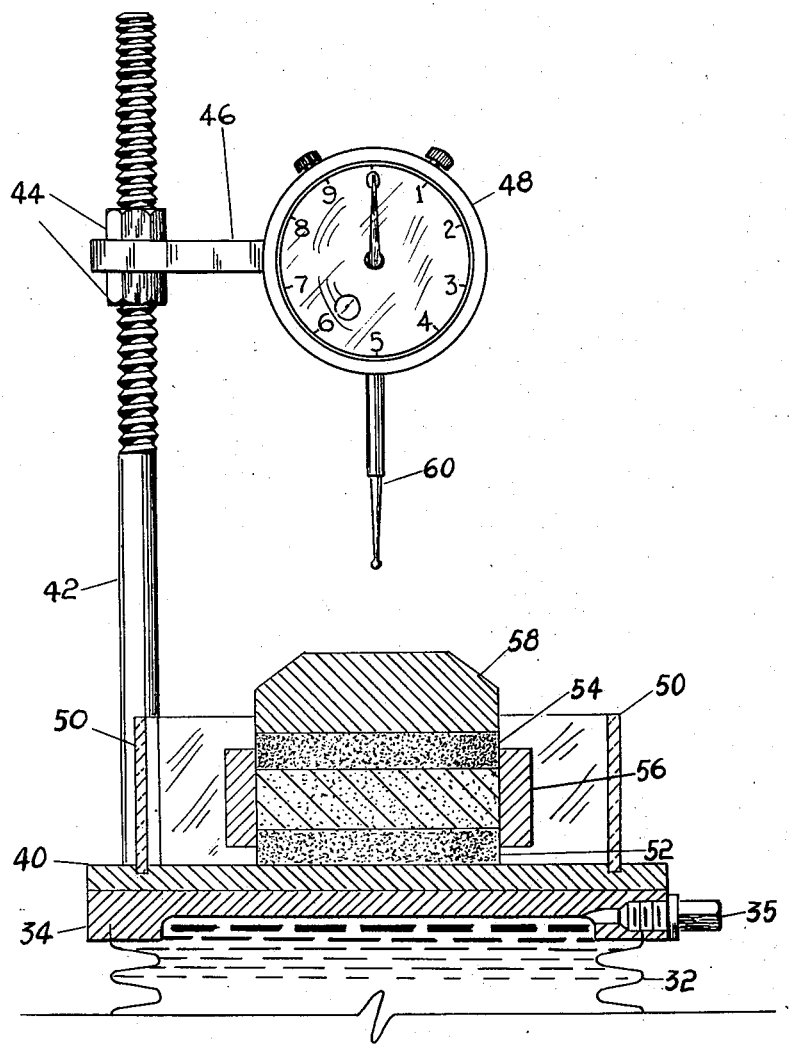
FIGURE IV

United States Patent Office 2,811,038
Patented Oct. 29, 1957

2,811,038

APPARATUS FOR THE CONSOLIDATION OF MATERIALS

Reuben H. Karol, Highland Park, N. J.

Application July 19, 1954, Serial No. 444,063

5 Claims. (Cl. 73—94)

This invention relates to consolidation testing, and to an apparatus designed to test the consolidation of materials, especially sub-surface soils. Particularly the invention relates to an apparatus designed to permit the instantaneous application of a given pressure to a confined material sample in such a manner that consolidation is brought about in a vertical plane. More particularly, the invention relates to an apparatus for testing soil consolidation and time-consolidation relationships by the application of regular increments of pressure instantaneously through the medium of both gas and hydraulic pressure.

It is basic that the application of stress to any material will cause a corresponding strain. For materials such as wood and steel, the strain caused by an application of stress occurs simultaneously with the stress. Fine-grained solids, on the other hand, usually exhibit a measurable time lag between the application of stress and the resulting strain. This phenomenon is called consolidation. It is most noticeable in soils, and particularly saturated or nearly saturated soils of low permeability.

In soils, the pore spaces between particles form tortuous inter-connecting passages, through which fluids can flow. The sizes of the passages, and therefore the void ratio, are functions of soil structure, particle shape, and size and load on the soil. The void ratio is limited by the condition that it cannot be less than zero and that the soil particles must be close enough to be in contact.

Since the grains of the soil are practically incompressible, any change in volume that occurs must be due to a change in the volume of the voids. Once a soil has been formed, its particle shape and size and its structure remains virtually unchanged. Thus, changes in void ratio must be due to changes in pressure.

For example, if a saturated, fine-grained soil at equilibrium is under a pressure $p$, at a void ratio $e$, and surface loading of the soil increases the load to P, the instant after the increase in load the void ratio remains at $e$, and, therefore, the load on the soil structure is still $p$. The excess load, $P-p$, is instantaneously carried by the water in the soil pores as excess hydrostatic pressure. The sudden increase in fluid pressure at the loaded area causes water to start moving from the loaded area to points of lower potential. The outward flow of water reduces the excess hydrostatic pressure, reduces the volume of voids, and transfers the pressure reduction in the soil to an increase in load on the soil structure.

The rate at which the water will flow from the loaded area is a function of the excess hydrostatic pressure. Since the excess hydrostatic pressure decreases as water flows from the loaded area, the rate at which the excess load is transferred to the soil is a constantly decreasing rate. Theoretically, equilibrium will never be reached, but for practical purposes, the process may be considered complete when the rate of volume change reduces to insignificance.

Soil masses consisting mainly of large particles such as sand and gravels have relatively large pore passages through which water can flow rapidly. For such soils the process described above may be completed in a matter of minutes or hours. Soil masses consisting mainly of fine grains such as silts and clays, may take months or years to approach equilibrium conditions. A structure built on such material may continue to subside during its entire life.

Consolidation is actually a three-dimensional process. Water flows away in all directions from a loaded saturated soil mass, and changes in dimension also occur in all directions. For an elastic material, three dimentional analysis is possible and practical, for a material with stress-strain relationships as complex as soil, however, three dimensional analysis is not feasible.

One dimensional analysis, however, has many direct applications to soils engineering. For example, a clay layer at some depth below the ground surface, between two layers of sand, may be subjected to an increased surface load. If a large area of the surface is loaded, the water in the clay will flow vertically into the much more permeable sand layers, rather than horizontally through the relatively impermeable adjacent clay. Practically all of the volume change will be due to a change in the thickness of the clay layer. This common case is essentially one-dimensional.

When surface loading is contemplated, as, for example, in building a new and heavy permanent structure such as a building, bridge abutments, permanent road-beds, and the like, it is essential to the engineer that he know how much consolidation of the soil to expect, and over what period of time. It is, therefore, the common practice to test the consolidation of soils furnishing the foundations for such permanent structures in order to determine the consolidation and the time-consolidation relationships. The apparatus of the present invention is designed to test both the consolidation of soils and other materials and this time-consolidation relationship.

Briefly stated, the apparatus of the present invention comprises means for testing the consolidation of soils or other materials by utilization of a gas and hydraulic pressure system, whereby a load is initiated by gas pressure and is transferred through a hydraulic system to a test material. By means of this apparatus the exact amount of consolidation that a test sample undergoes from a given load under any desired time interval may be determined. The apparatus is unique in that a predetermined load may be transferred to a test sample by a combination of gas and hydraulic pressure instantaneously. So far as is known, this is the first apparatus for the consolidation of materials having such a feature.

Broadly, the apparatus of the invention comprises a base, an extensible hydraulic cylinder, or chamber, mounted on said base, said cylinder having an upper end forming a vertically moveable pressure plate, a rigid bar or anvil supported horizontally above said pressure plate in substantially diametric relation thereto, means for supporting said bar in fixed vertical space relation to said base, means for supporting a sample on said plate, said means retaining said sample intermediate said bar and said plate, hydraulic means for extending said cylinder initially to bring said sample into pressure engagement with said bar, and means for separately registering the extent of consolidation of said sample and engagement pressure initially applied thereto.

More specifically, the apparatus comprises a base portion, or framing member, a gas pressure and liquid storage chamber mounted thereon, means for adjusting the gas pressure in said chamber, means for indicating the adjusted gas pressure, a hydraulic pressure chamber mounted on said base, said hydraulic pressure chamber being extensible in a vertical direction, means for introducing a pressurized fluid into said hydraulic pressure chamber from said gas pressure and liquid storage chamber, a movable pressure plate affixed to the extensible hydraulic pressure chamber and forming an integral part thereof, a rigid bar supported horizontally above said pressure plate in substantially diametric relation thereto, said horizontal bar having an enlarged annular hub portion and radial arms of equal length terminating in annular bosses disposed and adapted for coaxial relation with two supporting arms or standards, whereby the enlarged annular hub portion of said horizontal bar is centered between the standards and is coaxial with the pressure plate, a sample holding device adapted to be placed on said pressure plate and disposed so as to bring said sample into pressure engagement between said horizontal bar and said pressure plate, and gauging means for registering the extent of consolidation of said sample as a result of the application of pressure thereto.

In general, a load is placed on a sample to be tested in the apparatus by pressurizing the gas pressure chamber to the desired pressure as indicated on the gauging means. This pressure acts on the fluid that is in the chamber and transmits it by hydraulic principles to the extensible hydraulic pressure chamber and is converted to work by movement of the extensible pressure chamber and the movable pressure plate that is an integral part thereof. The work done is applied to the sample being tested in the sample holding device, in order to measure the consolidation and/or the time-consolidation relationship thereof.

The invention will be more clearly explained by reference to the drawings.

In the drawings, Fig. I represents a view in perspective, showing the apparatus assembled and in an operative attitude.

Fig. II represents a view, partly in vertical section, taken along the line II—II of Fig. I of the hydraulic pressure chamber showing the pressure plate and the sample holding device along with the indicator gauge for measuring movement of the pressure plate in relation to the horizontal bar.

Fig. III represents a view partly in vertical section of the gas pressure and liquid storage chamber, taken along the line III—III of Fig. I, showing the means for introducing pressure to the chamber and the gauge for indicating pressure within the chamber.

Fig. IV represents a view of the sample holding device apart from the apparatus showing the deflection, or movement indicator. A portion of the extensible hydraulic chamber is shown in this view. The pressure plate affixed to the extensible hydraulic chamber is shown.

Referring now to the drawings, a framing member, a base for holding the component parts in fixed relationship with one another, is represented by the number 2. This base may be fabricated or machined from a casting of aluminum, bronze, steel, or any other material that is stable. It contains as an integral part thereof a gas pressure and liquid storage chamber, 4. This chamber is fitted with a removable head, 6. The head is held in place on the chamber by means of screws, 8. The gas pressure and liquid storage chamber may also be of integral construction. However, it is preferred to utilize the construction shown, and the preferred embodiment so contemplates. This chamber is fitted with a gas inlet line 10, which connects with a gas pressure source through a gas regulator valve, 12, and line 14. The source of gas pressure is ordinarily compressed air, although any pressurized gas, such as nitrogen, carbon dioxide, or the like, may be used.

The gas pressure and liquid storage chamber are equipped with a pressure gauge 16, which measures the pressure within the chamber. Although in the drawings, the gas pressure gauge is shown attached at the top of the chamber, any arrangement that connects the gauge to the interior of the chamber proper may be used. Any of the commonly known gas pressure gauges may be utilized, such as a Bourdon gauge, a manometer, or the like, with the former being preferred.

The gas pressure and liquid storage chamber is also equipped with a bleeder valve 18, through which the gas pressure may be regulated as desired. The top of the chamber is equipped with an opening for addition of fluid to the chamber. This opening is stoppered by plug 20. At the bottom of the chamber there is a passage connecting with line 22 which permits liquid to flow from the chamber into line 22.

On the end of the framing member opposite the gas pressure chamber 4 there are affixed two upright standards, 24, having threads on the upper portions thereof, shown at 26. These supporting standards are threaded into the framing member or base, preferably, although they may be of an integral construction with the base. The upper threaded portions are fitted with two nuts, 28, on each member thereof. The nuts may be moved vertically in relation to the supporting standards by turning. Mounted horizontally between said support arms or standards and being supported by the lower of the two nuts is a movable horizontal bar, 30. This movable horizontal bar is thus supported in fixed vertical space relation to said base by means of standards 24 and nuts 28.

This movable horizontal bar has an enlarged annular hub portion 31, and radial arms of equal length 29, terminating in annular bosses disposed and adapted for coaxial relation with the standards 24, whereby the hub portion is centered between the standards. The hub portion is fitted with a hole that is positioned centrally above the point of the base member that is equidistant from the two support members.

Mounted centrally between the two support members on the base portion of the framing member and in diametric relation to said movable horizontal bar 30 is an extensible hydraulic cylinder 32. This hydraulic chamber is constructed of flexible metal in a bellows-like arrangement, so that it extends in a vertical direction upon application of hydraulic pressure from within. The hydraulic chamber is fitted at the upper end thereof with a pressure plate 34, which forms an integral portion of the chamber. The chamber is also equipped with an orifice fitted with plug 35. As the extensible hydraulic chamber expands and contracts in a vertical direction with the variance of pressure within the chamber, the pressure plate 34 moves upward and downward. When the movable horizontal bar 30 is maintained in fixed vertical space relationship with the base, said pressure plate 34 may be brought into pressure engagement with said bar.

At the base of the hydraulic chamber is a passage 35a, which connects through line 36 to a stopcock 38. This stopcock is connected at the opposite side thereof to a line 22, which leads to gas pressure chamber 4.

Resting on the pressure plate 34 is a sample holding device, as shown in Fig. IV. This device comprises a base plate 40, to which is affixed an upright supporting member 42. Supporting member 42 has threads on the upper portion thereof to accommodate nuts 44. A movable support arm 46, bossed at one end, is adapted to be fitted to the supporting member 42, and is held in place by nuts 44. This movable arm supports deflection gauge 48.

In one embodiment of this invention, there is recessed into the base plate 40 an annular ring 50. As shown, this ring is made of a plastic, transparent material. This annular ring, with base plate 40, forms a chamber for a testing sample. In the center of the chamber is placed a porous stone plate 52. A companion stone plate 54 is guided laterally with relation to plate 52, by means of a floating ring 56, which is of slightly greater inside diameter than the diameter of the porous stone plates. A sample is placed on stone plate 52 after having been trimmed to fill floating ring 56, and the stone plate 54 is placed on top of the sample. In order to effectively confine the sample by means of the stone plates and the annular ring, the thickness of the sample is slightly more than one half the height of the floating ring.

On top of porous stone plate 54 is placed an upper plate 58. The lower surface of this plate is adapted to match the upper stone plate 54, i. e., is of the same diameter, and the upper surface thereof is adapted to match the central annular hub portion of horizontal bar 30, again being of the same diameter.

The deflection gauge, or movement indicator 48 is equipped with an extended actuating pin 60. This gauge, or indicator, is so designed that extension of the actuating pin results in a reading on the dial. In other words, in Fig. IV, as the actuating pin moves downward, or conversely, as the indicator proper moves upward, the movement is registered on the gauge dial.

Through the hole in the annular hub portion of the horizontal bar 30, there extends a contact pin 62. This pin has an enlarged head that prevents it from passing downwardly through the hole. It is slightly longer than the thickness of the annular hub of the horizontal bar, so that an object fitted flush against the lower surface of the annular portion of the horizontal bar causes the contact pin 62 to extend above the upper surface of the hub.

As was stated above, Fig. II is a more detailed view of the hydraulic pressure chamber taken along the line II—II of Fig. I. This view is partly in vertical section and shows more in detail the hydraulic chamber 32, the pressure plate 34, with the sample holding device positioned on the pressure plate. In this view horizontal bar 30 is maintained in fixed relation to the base 2 by means of support members 24 and nuts 28. This view shows contact between the lower surface of hub portion 31 of horizontal arm 30 and plate 58. It will be noted that pin 62 extends slightly above the upper surface of hub 31 and actuating pin 60 of gauge 48 is contacting pin 62.

Fig. III shows more in detail the gas pressure and hydraulic pressure chamber 4, and is a view partly in vertical section taken along the line III—III of Fig. I.

Fig. IV, a view partly in vertical section of the sample holding device, shows more in detail the positioning of base 40 on pressure plate 34, the upper and lower porous stone plates with a sample between them maintained in fixed vertical relation by annular ring 56. Plate 58 is positioned on upper porous stone plate 54. The upper part of hydraulic chamber 32 is shown with orifice plug 35.

The apparatus is operated substantially as follows:

Plug 20 is removed from chamber 4 and a liquid, preferably a light oil or other hydraulic fluid, is added to chamber 4 until the hydraulic pressure chamber 32 and line 22 are filled with oil. During the addition of the oil, plug 35 is loosened or removed to permit any trapped air in chamber 32 to escape. When oil starts flowing from the chamber through the orifice of plug 35, it is replaced or tightened. Enough additional oil is added so that the pressure chamber 4 is about half filled with liquid. When the hydraulic chamber 32 and lines 22 are completely filled with fluid, and when gas pressure and liquid storage chamber 4 is about half filled with oil, stopcock 38 is closed and filler plug 20 is replaced.

The sample to be tested is fitted inside the annular floating ring 56. Porous stone plates 52 and 54 are placed below and above the sample and the assembly is set on base plate 40 in the middle of the annular chamber formed by base plate 40 and annular ring 50. Plate 58 is then placed on porous stone plate 54 and the sample holding device is placed on pressure plate 34.

The horizontal bar 30 is then adjusted by means of nuts 28 until the annular hub portion of the supporting bar is slightly lacking in contact with the upper surface of plate 58. Pin 62, however, which extends slightly below the surface of the annular hub portion of supporting bar 30, makes contact with the top of plate 58 and is thus extended slightly above the upper surface of the annular hub portion 31 of supporting arm 30.

The deflection gauge 48 is then adjusted by means of supporting arm 46 and nuts 44 so that the actuating pin 60 just contacts the top of pin 62. The indicator dial is then set at zero. The apparatus is adjusted so that there is a minute clearance between the top of plate 58 and the bottom of the annular hub 31 of the horizontal supporting arm 30.

Bleeder valve 18 on the gas pressure and hydraulic liquid storage chamber 4 is then closed, and line 14 is connected to a gas pressure source. The air regulator valve 12 is opened and pressure is admitted to chamber 4 until the desired pressure is indicated on dial 16. Fine adjustments of gas pressure may be made by means of bleeder valve 18.

When the desired gas pressure is obtained in chamber 4, that pressure is instantaneously applied to the sample in the sample holding device, substantially as follows.

Stopcock 38 is opened. The pressure of the gas in gas pressure and liquid storage chamber 4 is transmitted to the liquid in the chamber, becoming hydraulic pressure. This pressure is transmitted through lines 22, stopcock 38 and line 36 to the liquid in hydraulic chamber 32. This increased pressure on the completely filled chamber is transmitted to pressure plate 34 and the hydraulic pressure chamber extends vertically, causing pressure plate 34 to move upward. The movement of pressure plate 34 is transferred to base plate 40 of the sample holding device, through supporting member 42, and to the deflection indicator, or movement gauge 48.

However, until such time as top of plate 58 contacts the lower surface of the annular hub portion 31 of horizontal bar 30, there is no load on the sample. Since contact pin 62 is in direct contact with actuating pin 60, they move with the movement of plate 58 as a unit until contact between the plate 58 and hub 31 is made, and the dial setting of the indicator remains at zero.

Once contact is made between the top of plate 58 and the lower surface of the annular hub portion 31 of horizontal bar 30, the load is transferred from pressure plate 34 to the sample being tested through base plate 40 and porous plate 52. Resistance to the load is supplied by horizontal supporting arm 30, through plate 58 and porous plate 54. Consolidation of the sample as a result of this pressure occurs. After contact between plate 58 and arm 30, any further movement of plate 34 is indicated on the deflection gauge, since this movement is transmitted to the gauge, causing it to move away from the plate 58 and causing extension of actuating pin 60.

When stopcock 38 is closed, the load is maintained on the sample. It may be desirable to maintain the load on the sample for a definite time interval to obtain a time-consolidation relationship. In this event, it may be desirable to maintain a constant pressure throughout the system, this maintenance being accomplished by the gas pressure in the gas pressure and liquid storage chamber. For shorter intervals of time, however, or in order to maintain a given pressure while changing the pressure on the gas chamber, stopcock 38 is closed and pressure is maintained only in the hydraulic chamber.

A change in pressure or load, either increased or decreased, on the sample, is brought about by regulating the gas pressure in chamber 4 by gas regulator valve 12 or by bleeder valve 18. When the desired pressure is reached, as is indicated by gauge 16, stopcock 38 is again opened, transmitting the desired new load to the sample, substantially as described above.

To unload the sample, stopcock 38 is closed, and bleeder valve 18 is gradually opened in chamber 4 until the gas pressure as indicated by gauge 16 has been reduced to zero. Stopcock 38 is then opened, and pressure is released from the sample in the sample holding device.

Although the preferred embodiment of the apparatus of this invention has been described above, it will be appreciated that minor changes may be made without departing from the spirit of the invention. For example, the ratio of the diameters of the gas pressure chamber 4 and hydraulic chamber 32 may be varied in order to vary the pressure obtainable by pressure plate 34. Other modifications in construction of the apparatus may be made without limiting the scope of the invention.

To reiterate briefly, the instant invention relates to an improved apparatus designed for testing the consolidation characteristics of materials, especially sub-surface soils. The apparatus comprises a base, an extensible hydraulic cylinder mounted on said base, said cylinder having an upper end forming a vertically movable pressure plate, a rigid bar or anvil supported horizontally above said pressure plate in substantial diameteric relation thereto, means for supporting said bar in fixed vertical space relation to said pressure plate and said base, means for supporting a sample on said plate, said means retaining said sample intermediate said bar and said plate, hydraulic means for extending said cylinder initially to bring said sample into pressure engagement with said bar, and means for separately registering the extent of consolidation of said sample and for registering the engagement pressure initially applied thereto.

What is claimed is:

1. An apparatus for measuring consolidation characteristics of materials which comprises a base, an extensible hydraulic cylinder mounted on said base, said cylinder being adapted to be increased in vertical dimension by the application of increased pressure within said cylinder, said cylinder being equipped with an orifice for the removal of liquid and an orifice for the introduction of liquid, said first orifice being equipped with a plug and said second orifice being equipped with means for regulating the introduction of liquid, said cylinder having an upper end forming a vertically movable pressure plate, a rigid bar supported horizontally above said pressure plate in substantial diametrical relation thereto, said rigid bar having an upper portion with a hole centrally located therein, two radial arms of equal length terminating in annular bosses adapted to retain said bar in coaxial relation to said base, means for supporting said horizontal bar in fixed vertical space relation to said base, means for supporting a sample on said pressure plate, said means retaining said sample intermediate said bar and said plate, said retaining means comprising a base, a supporting member affixed to said base, a movable supporting arm bossed at one end and adapted to be fitted to said supporting member and to be held in fixed relation to said base thereby, an annular ring member recessed into said base and forming a chamber with said base, two porous stone plates of substantial equal diametric dimension and thickness, an annular ring of slightly larger diameter than said plates, adapted to surround said porous plates in vertical relation and a plate of the same diameter on one surface thereof as said porous stone plates and of a diameter on the opposite surface thereof of different diameter than said porous stone plates, hydraulic means for extending said cylinder initially to bring said sample into pressure engagement with said bar, said hydraulic means comprising a gas pressure and liquid storage chamber having a removable head, said chamber being fitted with means for introducing a liquid under pressure and with means for indicating pressure within said chamber, said chamber being equipped with means for transfer of pressurized fluid to said hydraulic chamber and means for separately registering the extent of consolidation of said sample and engagement pressure initially applied thereto, said means for registering the extent of consolidation comprising a supporting member, a supporting arm, means for maintaining said supporting arm in fixed relation to said supporting member, a movement indicator having an extensible actuating pin, said indicator being designed so that extension of said actuating pin registers on said indicator.

2. An apparatus which comprises in combination a base, a gas pressure and liquid storage chamber mounted on said base, means for introducing pressurized gas into said chamber, means for introducing a liquid into said chamber, means for regulating pressure in said chamber, means for gauging pressure within said chamber, a hydraulic pressure chamber that is extensible in a vertical direction mounted on said base in a position at the opposite end of said gas pressure and liquid storage chamber, means for introducing pressurized fluid from said gas chamber to said hydraulic chamber, means for regulating the introduction of pressurized fluid into said hydraulic chamber, a pressure plate affixed to said extensible hydraulic chamber and forming an integral part thereof, means for removing gas from said hydraulic chamber, two support members affixed to said base in diametric relation to said hydraulic chamber, a horizontal supporting arm having a hub portion and two radial arms of equal length terminating in annular bosses disposed and adapted for coaxial relation with said support members, means for maintaining said horizontal support arm in a predetermined fixed position, gauging means for indicating movement of said pressure plate in relation to said horizontal supporting arm, and a sample retaining device adapted to maintain a sample in pressure engagement between said pressure plate and said horizontal supporting arm, said sample retaining device comprising a base, a supporting member affixed to said base, a movable supporting arm bossed at one end and adapted to be fitted to said supporting member and to be held in fixed relation to said base thereby, an annular ring member recessed into said base and forming a chamber with said base, two porous stone plates of substantial equal diametrical dimensions and thickness, an annular ring of slightly larger diameter than said plates adapted to surround said porous plates in vertical relation and a plate of the same diameter on one surface thereof as said porous stone plates and of a diameter on the opposite surface thereof of slightly smaller diameter than said porous stone plates.

3. An apparatus for the consolidation of materials which comprises in combination a base, a gas pressure and liquid storage chamber mounted on said base, said chamber being fitted with means for introducing liquid and gas into said chamber and with means for gauging gas pressure in said chamber, a hydraulic pressure chamber that is extensible in a vertical direction mounted on said base, means for introducing pressurized fluid from said gas pressure chamber into said hydraulic pressure chamber, means for regulating the introduction of said pressurized fluid, a pressure plate affixed to said hydraulic pressure chamber and forming an integral part thereof, two support members affixed to said base in diametric relation to said hydraulic chamber, a horizontal arm having a hub portion and two radial arms of equal length terminating in annular bosses disposed and adapted for coaxial relation with said support members, means for maintaining said horizontal arm in a predetermined fixed position substantially diametric to said pressure plate and a sample retaining device adapted to be positioned centrally upon said pressure plate, said sample retaining device comprising a base, an annular ring recessed in said base forming an annular chamber therewith, two porous stone plates, an annular floating ring of slightly larger diameter than said plates for guiding said third plates laterally with respect to each other, a plate having a lower surface of the same diameter as said annular porous plates and said hub of said horizontal floating arm, a support standard fixed to said base, a supporting arm bossed at one end thereof and being adapted and disposed for coaxial relation with said support standard, a movement indicator adjustably mounted on said support arm equipped with an extensible actuating pin, a contacting pin fitted through a hole in said hub of said horizontal supporting arm and adapted to make contact between said plate of said sample holding device and said extensible actuating pin, said contacting pin being of slightly greater length than the vertical dimension of said hub.

4. An apparatus for consolidation of materials such as sub-surface soils which comprises in combination a base, a gas pressure and liquid storage chamber mounted thereon, means for introducing liquid into said chamber, means for introducing pressurized gas into said chamber, valve means for adjusting the gas pressure of said chamber, gauging means for indicating the gas pressure in said chamber, a hydraulic pressure chamber that is extensible in a vertical direction mounted on said base, means for introducing pressurized fluid into said hydraulic pressure chamber from said gas pressure and liquid storage chamber, means for regulating the introduction of pressurized fluid into said chamber, a movable pressure plate affixed to the top of said hydraulic pressure chamber and forming an integral part thereof, two supporting standards mounted on said base in diametric relation to said hydraulic pressure chamber, a horizontal supporting arm movably mounted on said standards, said horizontal supporting arm having a central annular hub of substantially cylindrical shape and fitted with a hole positioned centrally therein substantially above the central portion of said movable pressure plate, a contacting pin fitted to move freely within said hole and of a length slightly greater than said hub of said supporting arm, a sample holding device adapted to rest on said movable pressure plate and comprising a base, an annular ring recessed in said base and forming an annular chamber therewith, two porous stone plates adapted to be placed above and below a test sample, an annular ring adapted to guide said porous stone plates laterally with each other, a third plate having a lower surface of the same diameter as the upper porous stone plate and the lower surface of the central annular hub of said supporting member, and an indicating gauge adjustably mounted on said base of said sample holding device in a position above said contacting pin, said indicating gauge having an extensible actuating pin and being adapted to register when said actuating pin is extended.

5. An apparatus for measuring consolidation characteristics of materials comprising a base, an extensible hydraulic cylinder mounted on said base, said cylinder having an upper end forming a vertically movable pressure plate, a rigid bar supported horizontally above said pressure plate in substantial diametric relation thereto, means for supporting said bar in fixed vertical space relation to said base, means for supporting a sample on said pressure plate comprising a base, a supporting member affixed to said base, a movable supporting arm bossed to one end and adapted to be fitted to said supporting member and to be held in fixed relation to said base thereby, an annular ring member recessed into said base and forming a chamber with said base, two porous stone plates of substantial equal diametrical dimensions and thickness, an annular ring of slightly larger diameter than said plates adapted to surround said porous stones in vertical relation and a plate of the same diameter on one surface thereof as said porous stone plates and of a diameter on the opposite surface thereof of slightly smaller diameter than said porous plates, a hydraulic means for extending said cylinder initially to bring said sample into pressure engagement with said bar and means for separately registering the extent of consolidation of said chamber and engagement pressure initially applied thereto.

References Cited in the file of this patent

UNITED STATES PATENTS

| | | |
|---|---|---|
| 1,846,048 | Desautels | Feb. 23, 1932 |
| 1,985,598 | Carver | Dec. 25, 1934 |
| 2,078,296 | Vadner | Apr. 27, 1937 |
| 2,298,466 | Dames | Sept. 22, 1942 |